Figure 1:
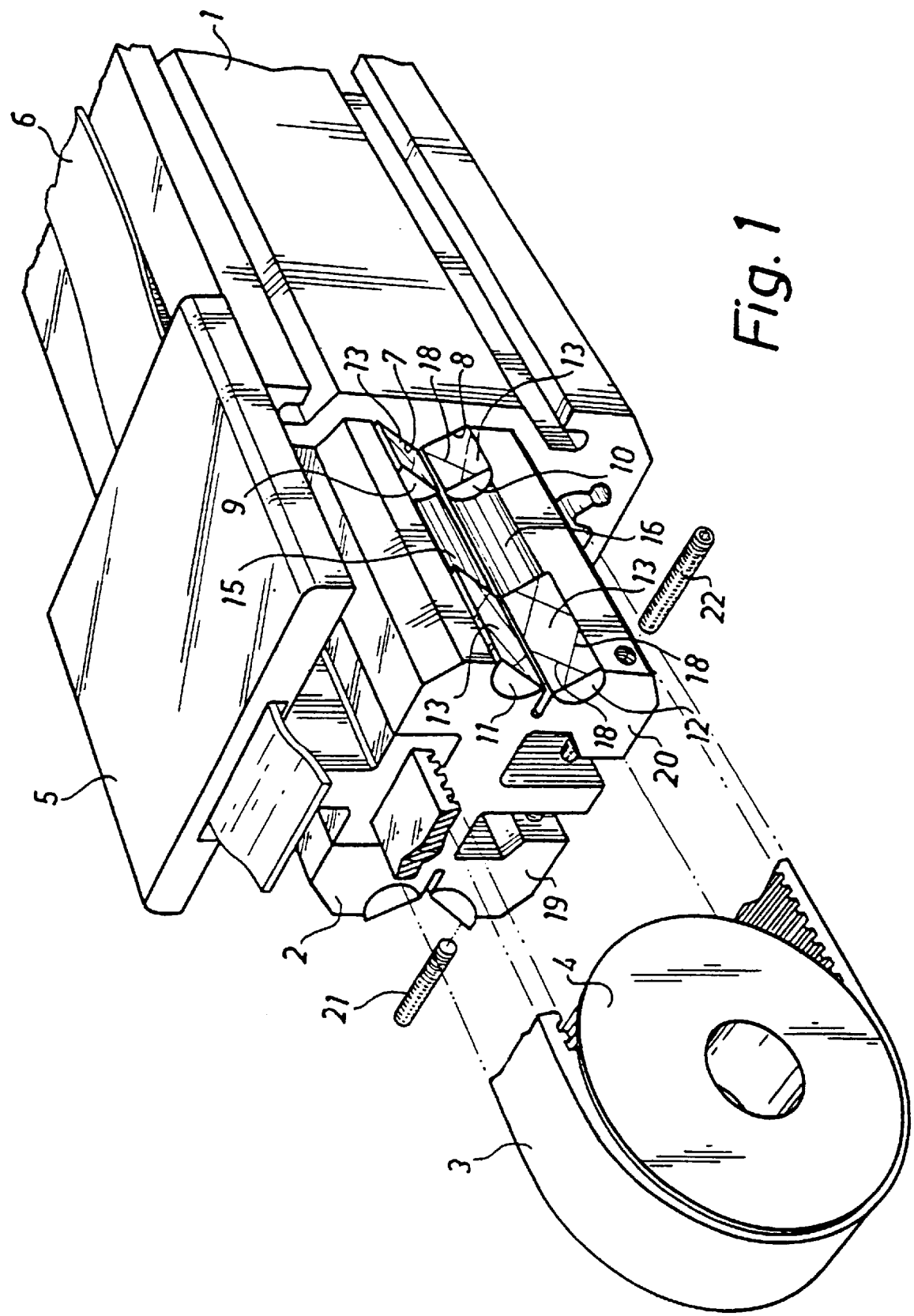

United States Patent [19]
Andreasson

[11] Patent Number: 6,036,366
[45] Date of Patent: Mar. 14, 2000

[54] BEARING DEVICE

[75] Inventor: Sune Andreasson, Kristianstad, Sweden

[73] Assignee: Warner Electric Aktiebolag, Kristianstad, Sweden

[21] Appl. No.: 09/117,254

[22] PCT Filed: Jan. 24, 1997

[86] PCT No.: PCT/SE97/00113

§ 371 Date: Sep. 21, 1998

§ 102(e) Date: Sep. 21, 1998

[87] PCT Pub. No.: WO97/27129

PCT Pub. Date: Jul. 31, 1997

[30] Foreign Application Priority Data

Jan. 26, 1996 [SE] Sweden .................................. 9600280

[51] Int. Cl.$^7$ ...................................................... F16L 29/02
[52] U.S. Cl. .................................................................. 384/42
[58] Field of Search .................................. 384/26, 38, 42

[56] References Cited

U.S. PATENT DOCUMENTS

| | | | |
|---|---|---|---|
| 2,452,804 | 11/1948 | Sulprizio | 384/42 |
| 4,247,162 | 1/1981 | Jordan | 384/42 X |
| 4,856,415 | 8/1989 | Noda | 384/42 X |

Primary Examiner—Thomas R. Hannon
Attorney, Agent, or Firm—Dvorak & Orum

[57] ABSTRACT

A bearing device in such linear actuators which comprises an elongated hollow profile rail, in which a slide member can be moved backwards and forwards along flat guiding surfaces in the hollow profile rail. In pairs, the guiding surfaces form an angle with one another. Between the hollow profile rail and the slide member are slide bushings arranged in pairs. The slide bushings each include a flat face that abuts against the guiding surfaces of the hollow profile rail, and a curved face that abuts against a correspondingly configured seat in the slide member.

3 Claims, 2 Drawing Sheets

BEARING DEVICE

The invention relates to a bearing device in linear actuators. Such actuators are used for example when transferring goods or workpieces from one place to another in a workshop.

One type of linear actuator which is frequently used, both in the above described situation and in several other situations, is an elongated hollow profile rail, in which a slide member can be moved backwards and forwards along flat guiding surfaces in the hollow profile rail. According to modern technology, this hollow profile rail can be injection moulded to close precision, that is, with comparatively good accuracy of measurements, for example with respect to the distance between the guiding surfaces of two opposite sides in the hollow profile rail. Until now, it has been considered necessary to provide the roller or flat bearings arranged between the slide member and the hollow profile rail with resilient means of some kind to absorb the tolerances and ensure that the slide member in each moment of movement easily glides in the hollow profile rail without the risk of its getting stuck therein. Consequently, it has until now been necessary to use an unnecessarily complicated roller or flat bearing construction.

Owing to the invention a very simple but still a most reliable bearing device for linear actuators of the above described type has been produced. The characteristic features of this bearing device are defined in the appended claims.

Figure 2:
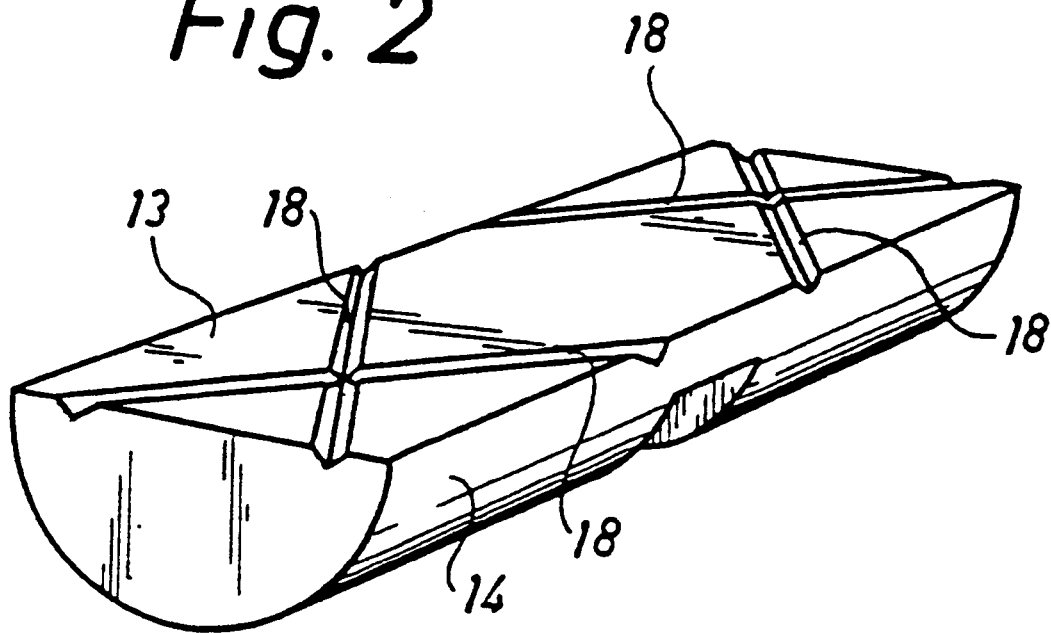
Figure 3:
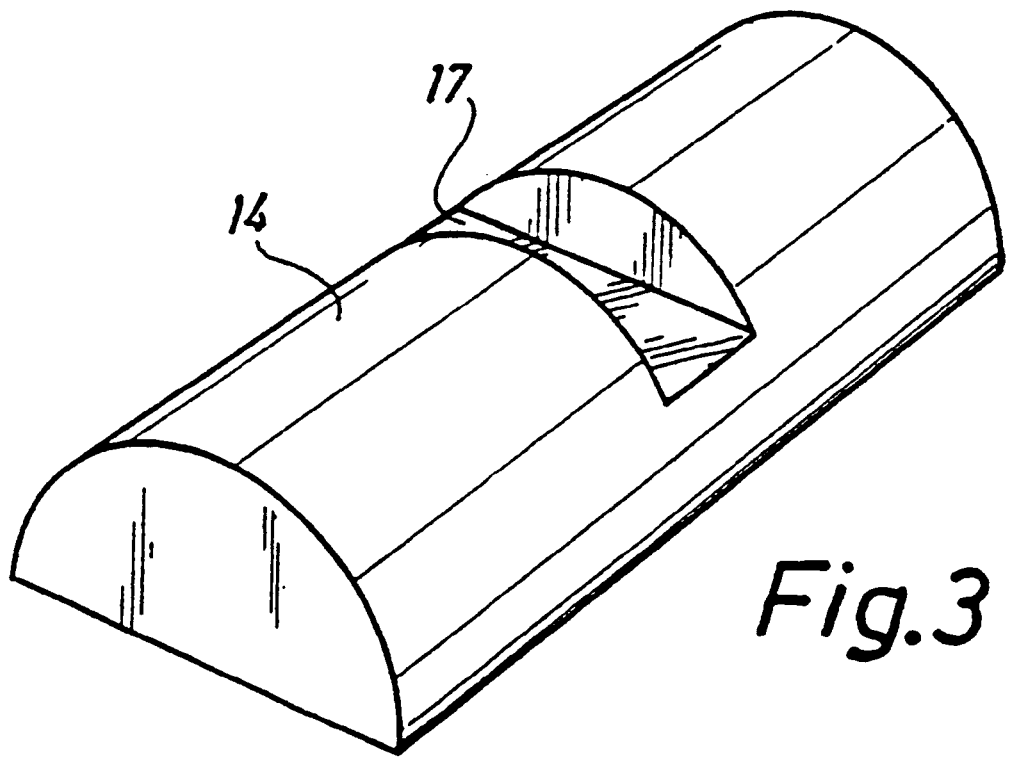

The invention will be described in closer detail in the following with reference to the accompanying drawings, in which FIG. 1 illustrates one part of a linear actuator, with a bearing device according to the invention in perspective and FIGS. 2 and 3 are different perspective views of a slide bushing which forms a part of the bearing device.

In order to describe the bearing device according to the invention, a linear actuator has been illustrated as an example in FIG. 1, said linear actuator comprising a hollow profile rail 1 in which rail is arranged a slide member 2. Said slide member 2 can be moved backwards and forwards in the hollow profile rail 1 by means of a cog belt 3, said belt running over a cog wheel 4, which wheel in turn is connected to the drive shaft of an electric motor, not shown. The slide member 2 is connected to a plate 5 which is arranged on the outside of the hollow profile rail 1, to which plate components of different kinds can be connected, depending on the intended function of the linear actuator. A sealing strip 6 fits the hollow profile rail 1 tightly, preventing dust and dirt from penetrating into the hollow profile rail.

Interiorly, the hollow profile rail 1 is provided, on two opposite sides, with flat guiding surfaces 7,8 (shown only on one side in FIG. 1). In pairs, these guiding surfaces 7, 8 form an angle with one another. Between the hollow profile rail 1 and the slide member 2 slide bushings 9, 10 and 11, 12 are arranged in pairs correspondingly. These slide bushings are, as is more closely illustrated in FIGS. 2 and 3, configured with a flat face 13, said flat face 13 being designed to abut against any of the guiding surfaces 7, 8, and the slide bushings 9, 10 and 11, 12 are configured with a curved face 14, which abuts against a correspondingly configured seat 15, 16 in the slide member 2.

The slide bushing 9, 10, 11, 12 is provided with a notch 17 in its curved face 14. Into this notch 17 a stopping means, not illustrated, will engage, said stopping means protruding from the seat 15, 16 in the slide member 2, the stopping means being arranged to prevent the bushing 9, 10, 11, 12 from sliding out of the slide member 2 when the slide member 2 moves inside the hollow profile rail 1.

In the flat face 13, which forms a surface sliding against the guiding surfaces 7 and 8 in the hollow profile rail 1, the slide bushing 9, 10, 11, 12 is preferably provided with one or several transverse grooves 18. As illustrated, these transverse grooves 18 preferably cross each other in pairs in the flat face 13 of the slide bushing 9, 10, 11, 12. These transverse grooves 18 are designed to prevent too strong a suction effect from generating between the flat face 13 and the guiding surface 7, 8, which could lead to adherence, which, among professionals is usually called the "stick-slip-effect".

Owing to the design of the bearing device according to the invention in the described way with a slide bushing 9, 10, 11, 12, which rests in a correspondingly configured seat 15, 16 by means of a curved face 14, and which slide bushing by means of a flat sliding surface 13 abuts against the guiding surfaces 7 and 8 of the hollow profile rail 1, said guiding surfaces 7 and 8 forming an angle with one another, a self-regulating support of the slide member 2 in the hollow profile rail is achieved. The bearing device thus has the ability to absorb tolerances during the moving of the slide member 2 through the hollow profile rail 1 because of minor torsions of the slide bushings 9, 10, 11, 12 to one side or the other in their seats 15, 16.

At its lower part, the slide member 2 is configured with a pair of legs 19, 20 which, by means of threaded pins 21, 22, can be pulled apart somewhat to eliminate or minimise a play, if any, between the slide member 2 and the hollow profile rail 1.

The invention is not limited to the illustrated and described embodiment, but can be varied in several ways within the scope of the appended claims. Thus, the guiding surfaces 7, 8 can be placed at a certain distance from each other and consequently the slide bushings 9, 10, 11, 12 in their seats 15, 16 can also be placed at corresponding distances from each other. Further, the guiding surfaces 7, 8 can extend at an angle towards each other instead of, as illustrated, away from each other, and consequently the slide bushings 9, 10, 11, 12 can extend at an angle away from each other instead of, as illustrated, towards each other.

The invention can of course be used in other linear actuators than the one illustrated and described, for example in such linear actuators where the slide member 2 is moved by way of a feed screw instead of a cog belt.

I claim:

1. A bearing device in linear actuators, comprising:

an elongated hollow profile rail, in which rail a slide member can be moved backwards and forwards along flat guiding surfaces in the hollow profile rail;

slide bushings arranged between the hollow profile rail and the slide member, said slide bushings in pairs each abutting with a flat face against a guiding surface, and with a curved face resting in a correspondingly configured seat in the slide member, wherein each slide bushing in its flat face is provided with one or several transverse grooves, said grooves being provided to prevent adherence between the slide bushings and the guiding surface against which it abuts.

2. The device according to claim 1, wherein the transverse grooves cross each other in pairs in the flat face of each slide bushing.

3. The device according to claim 1, wherein each slide bushing includes a notch in its curved face, into which notch a stopping means protruding from the seat in the slide member engages, said stopping means being arranged to prevent displacement of the slide bushing in the seat in the direction of movement of the slide member.

* * * * *